(12) United States Patent
Inoue (10) Patent No.: US 6,270,240 B1
(45) Date of Patent: Aug. 7, 2001

(54) STRUCTURE FOR ILLUMINATING SUNVISOR

(75) Inventor: Takuya Inoue, Nagoya (JP)

(73) Assignees: Harness Systems Technologies Research, Ltd., Nagoya; Sumitomo Wiring Systems, Ltd., Mie; Sumitomo Electric Industries, Ltd., Osaka, all of (JP)

( * ) Notice: Subject to any disclaimer, the term of this patent is extended or adjusted under 35 U.S.C. 154(b) by 0 days.

(21) Appl. No.: 09/386,340

(22) Filed: Aug. 31, 1999

(30) Foreign Application Priority Data

Dec. 17, 1998 (JP) .................................................. 10-359552

(51) Int. Cl.[7] .................................. B60Q 3/02; F21V 8/00
(52) U.S. Cl. .......................... 362/492; 362/141; 362/142; 362/511; 362/560
(58) Field of Search ..................................... 362/135, 136, 362/140–144, 492, 511, 551, 577, 560

(56) References Cited

U.S. PATENT DOCUMENTS

| | | | | |
|---|---|---|---|---|
| 4,792,884 | * | 12/1988 | Suman et al. | 362/135 |
| 5,303,125 | * | 4/1994 | Miller | 362/141 |
| 5,452,186 | * | 9/1995 | Dassanayake | 362/511 |
| 5,498,056 | * | 3/1996 | Viertel et al. | 362/492 |
| 5,548,492 | * | 8/1996 | Hansen et al. | 362/492 |

\* cited by examiner

Primary Examiner—Alan Cariaso
(74) Attorney, Agent, or Firm—Oliff & Berridge, PLC (57) ABSTRACT

Illuminating light of an illuminating lamp 32 of a lamp socket 31 in a roof panel 1 is made incident on an incident end of a light guide 17 for the stay 16 at an end of a vertical shaft portion 16b of a stay 16. Illuminating light emitted from the emission end of the light guide 17 for the stay 16 at the end of the horizontal shaft portion 16a of the stay 16 is guided to an illuminating light guide 15 through a sunvisor-side light guide 19 so that the sunvisor is illuminated with the illuminating light guide 15.

6 Claims, 10 Drawing Sheets

STRUCTURE FOR ILLUMINATING SUNVISOR

BACKGROUND OF THE INVENTION

The present invention relates to a structure for illuminating a sunvisor.

Figure 10:
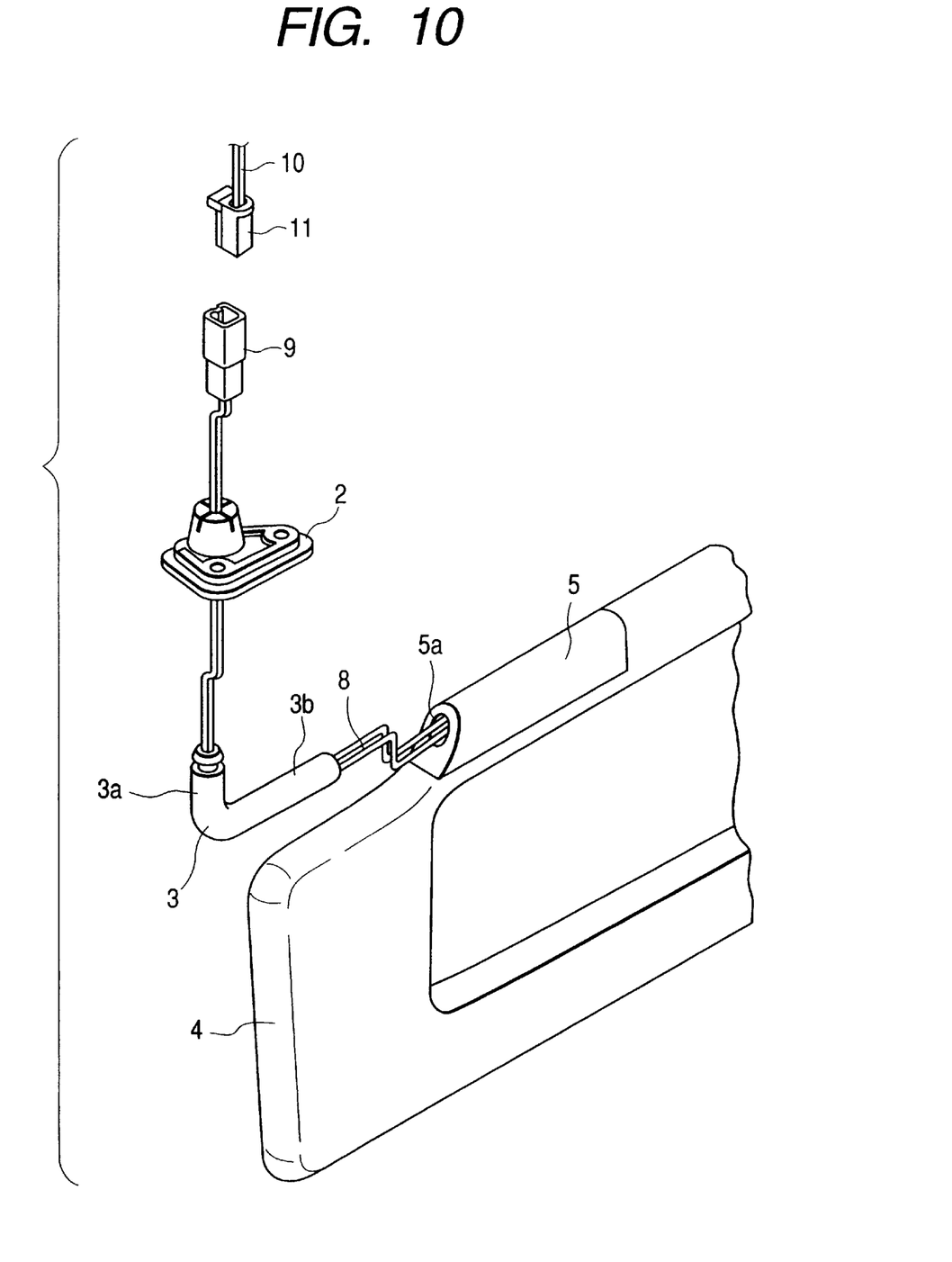
FIG. 10 is an exploded perspective view showing a conventional sunvisor.
Figure 11:
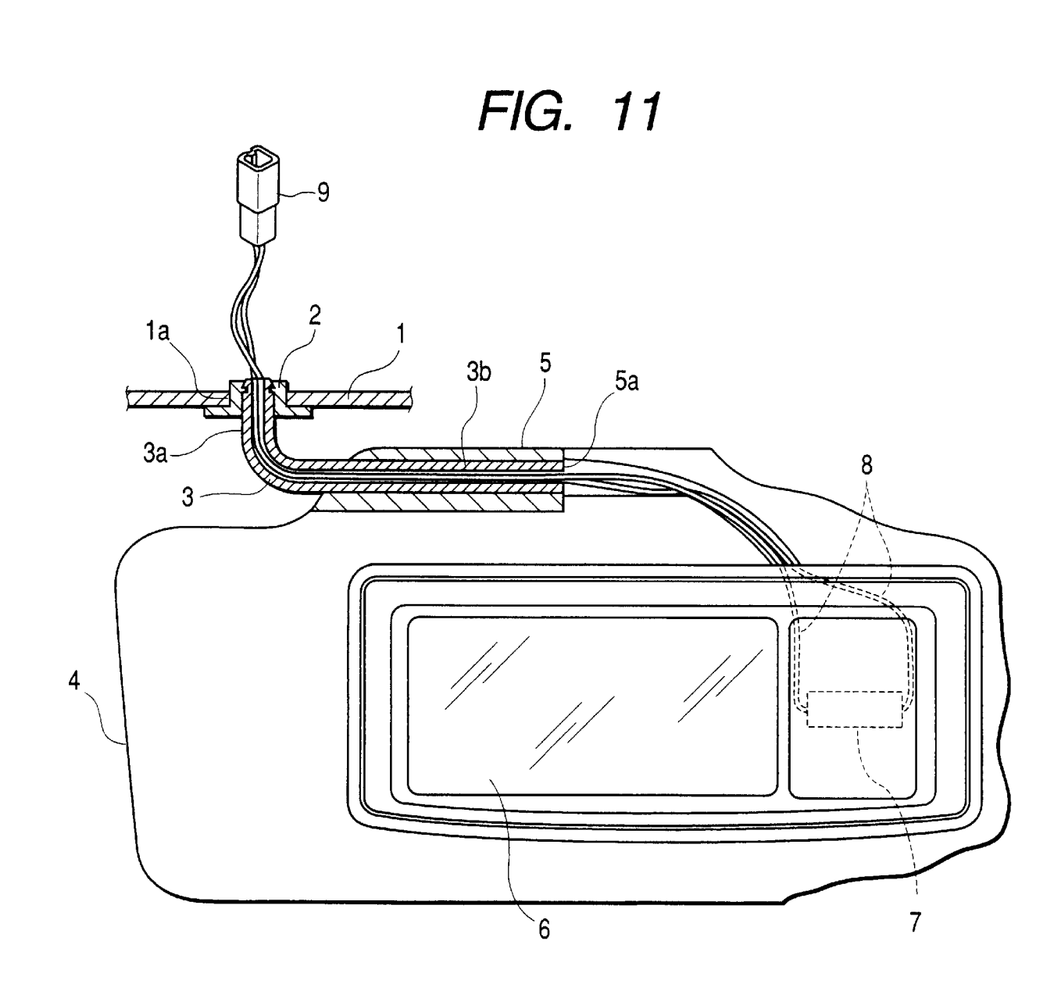
FIG. 11 is a front elevational cross sectional view showing an essential portion of the conventional sunvisor.

In general, a sunvisor is, as shown in FIGS. 10 and 11, structured such that a horizontal shaft portion 3b of an L-shape pipe stay 3 having a vertical shaft portion 3a supported rotatively around the vertical shaft by a stay holder 2 joined to a roof panel 1 in a vehicle is inserted into a visor holder 5 of a sunvisor body 4. Thus, the sunvisor body 4 is supported movably in the vertical direction around a horizontal shaft.

The sunvisor body 4 having a vanity mirror 6 is provided with a vanity lamp (an illuminating member) 7. When a cover (not shown) of the vanity mirror 6 is opened, a switch is switched on so that the vanity lamp 7 is turned on.

Ends of a pair of electric wires 8 are connected to the vanity lamp 7. The electric wires 8 are allowed to pass through the inside portion of the stay 3. A sunvisor-body-side connector 9 joined to other ends of the electric wires 8 is, in the roof panel 1, connected to a car-body-side connector 11 connected to an electric wire 10 extended from a battery. Thus, the battery in the car body and the vanity lamp 7 of the sunvisor body are electrically connected to each other.

When each of vertical movement of the sunvisor body 4 around the horizontal shaft of the stay 3 and lateral movement (when the sunvisor is used) of the sunvisor body 4 around the vertical shaft is performed, each of the electric wires 8 is twisted to permit the movement of the sunvisor body 4.

An operation for joining the stay holder 2, which supports the stay 3 of the sunvisor body 4, to the roof panel 1 is performed as follows: an operator holds the car-body-side connector 11 by either hand thereof while holding the sunvisor body 4 under the operator's arm in a state in which the car-body-side connector 11 has been drawn into the car body through adjoining hole 1a of the roof panel 1. Then, the sunvisor-body-side connector 9 is held by the other hand so that the sunvisor-body-side connector 9 and the car-body-side connector 11 are connected to each other. Then, the sunvisor-body-side connector 9 and the electric wires 8 are pushed inwards into the inside portion of the roof panel 1 through the joining hole 1a while the car-body-side connector 11 and the electric wire 10 are being pushed inwards into the inside portion of the roof panel 1 through the joining hole 1a. Then, the stay holder 2 makes contact with the roof panel 1 so as to be secured with screws.

The electric wires 8 of the vanity lamp 7, which must be allowed to pass through the L-shape stay 3, however, require a complicated operation for passing the electric wires. Since the sunvisor-body-side connector 9 must be connected to the other ends of the electric wires 8, also the operation for connecting the sunvisor-body-side connector becomes too complicated.

What is worse, the operator must connect the connectors 9 and 11 with two hands while holding the sunvisor body 4 under the operator's arm in a state in which the operator faces the roof portion. Therefore, the operation for connecting the connectors is too complicated. Since the electric wires 10 and 8 and the connectors 9 and 11 must be pushed inwards into the inside portion of the roof panel 1 through the joining hole 1a, the operation for joining the sunvisor becomes too complicated. As described above, there arise a variety of problems.

To overcome the foregoing problems experienced with the conventional technique, an object of the present invention is to provide a structure for illuminating a sunvisor with which a variety of operations concerning illumination which is performed by an illuminating member provided for a sunvisor body can be simplified.

SUMMARY OF THE INVENTION

To solve the foregoing problems, according to aspect 1 of the present invention, there is provided a structure for illuminating a sunvisor structured such that a horizontal shaft portion of an L-shape stay having a vertical shaft portion supported rotatively around the vertical shaft by a stay holder joined to a roof panel in a vehicle is inserted into a visor holder of a sunvisor body so that the sunvisor body is supported movably in the vertical direction around a horizontal shaft and the sunvisor body is provided with an illuminating member, the structure for illuminating a sunvisor comprising:

a stay-side light guide insert-molded into the stay; a lamp socket which holds a lamp, the light from which is made incident on an incident end of the stay-side light guide and which is disposed opposite to an end of the vertical shaft portion of the stay; and a sunvisor-side light guide provided for the sunvisor body and arranged to introduce, to an illuminating light guide, light emitted from an emission end of the stay-side light guide at the end of the horizontal shaft portion of the stay.

According to a first aspect of the present invention, illuminating light emitted from the lamp of the lamp socket disposed in the roof panel is made incident on the incident end of the stay-side light guide at the end of the vertical shaft portion. Illuminating light emitted from the emission end of the stay-side light guide at the end of the horizontal shaft portion of the stay is introduced into the illuminating light guide through the sunvisor-side light guide. Thus, the illuminating light guide performs the illumination. Therefore, the necessity of passing the electric wires of the vanity lamp into the L-shape pipe stay can be eliminated. Hence it follows that the operation for passing the electric wires can be eliminated.

According to a second aspect of the present invention, the illuminating light guide is a frame-shape member which surrounds the outer surface of a vanity mirror joined to the sunvisor body, whereby illumination outward of the vanity mirror occurs.

According to a third aspect of the present invention, the incident end of the sunvisor-side light guide is joined to the visor holder of the sunvisor body so that the emission end of the stay-side light guide at the end of the horizontal shaft portion is made to be opposite to the incident end of the sunvisor-side light guide when the horizontal shaft portion of the stay is inserted into the visor holder. In the foregoing case, the operation for inserting the horizontal shape portion of the stay into the visor holder can simply be completed by only making the emission end of the stay-side light guide at the end of the horizontal shaft portion to be opposite to the incident end of the sunvisor-side light guide. Therefore, the operation for connecting the connectors required for the conventional technique can be omitted. The vertical movement of the sunvisor body around the horizontal shaft does not require the sunvisor-side light guide to be rotated around the horizontal shaft.

According to a fourth aspect of the present invention, the lamp socket, to which an electric wire extended from a battery is connected, is joined to a car-body member disposed in the roof panel so that the incident end of the stay-side light guide is made to be opposite to the lamp of the lamp socket when the stay holder which supports a stay-side end of the vertical shaft portion is joined to the roof panel. In the foregoing case, the operation for joining the socket holder to the roof panel can simply be completed by making the incident end of the stay-side light guide at the end of the vertical shaft to be opposite to the lamp of the lamp socket. Therefore, the operation for connecting the connectors required for the conventional technique can be omitted. The longitudinal movement of the sunvisor body around the vertical shaft does not require the lamp socket of the car body to be rotated around the vertical shaft.

According to a fifth aspect of the present invention, the car-body member is provided with the socket holder to which the lamp socket can be inserted and joined from an axial direction or a direction perpendicular to the axial direction, and displacement of a joining portion of the socket holder in the direction perpendicular to the axial direction is permitted. The lamp socket can be joined to the socket holder of the car-body member by one-touch operation. Since displacement of the lamp socket in the direction perpendicular to the axis is permitted by the joining portion, an error or the like from the holder portion of the stay holder occurring when assembly is performed can be absorbed. As a result, the holder portion of the stay holder can smoothly be inserted.

According to a sixth aspect of the present invention, an insertion portion is provided for the car-body member, and the socket holder is inserted and joined to the insertion portion. The foregoing structure enables the socket holder to be joined to the car-body member by a one-touch operation.

DETAILED DESCRIPTION OF THE PREFERRED EMBODIMENTS

An embodiment of the present invention will now be described with reference to the drawings. The same elements as those of the conventional technique are given the same reference numerals and the same elements are omitted from description.

As shown in FIGS. 1 to 3B, the sunvisor incorporates a sunvisor body 4 formed into a rectangular-plate-like shape elongated in a lateral direction. The sunvisor body 4 is made of, for example, styrofoam. A recess 4a for securing a frame 14 formed by combining a vanity mirror 6 and an illuminating light guide 15 formed into a frame shape which surrounds the vanity mirror 6 is formed in the front surface of the sunvisor body 4. Moreover, a visor holder 5 having an insertion hole 5a, into which a stay 16 to be described later is inserted, is joined to the upper portion of the sunvisor body 4. Note that the frame 14 is provided with a cover (not shown) which can arbitrarily be opened/closed. The sunvisor body 4 is covered with an outer skin. The L-shape stay 16 has a horizontal shaft portion 16a and a vertical shaft portion 16b. The horizontal shaft portion 16a of the stay 16 is inserted into the insertion hole 5a of the visor holder 5 so that the sunvisor body 4 is supported such that vertical movement of the sunvisor body 4 around the horizontal shaft is permitted. The stay 16 is locked by a lock spring or the like for the purpose of preventing removal of the stay 16 after the stay 16 has been inserted into the insertion hole 5a of the visor holder 5 to a predetermined depth.

Figure 4:
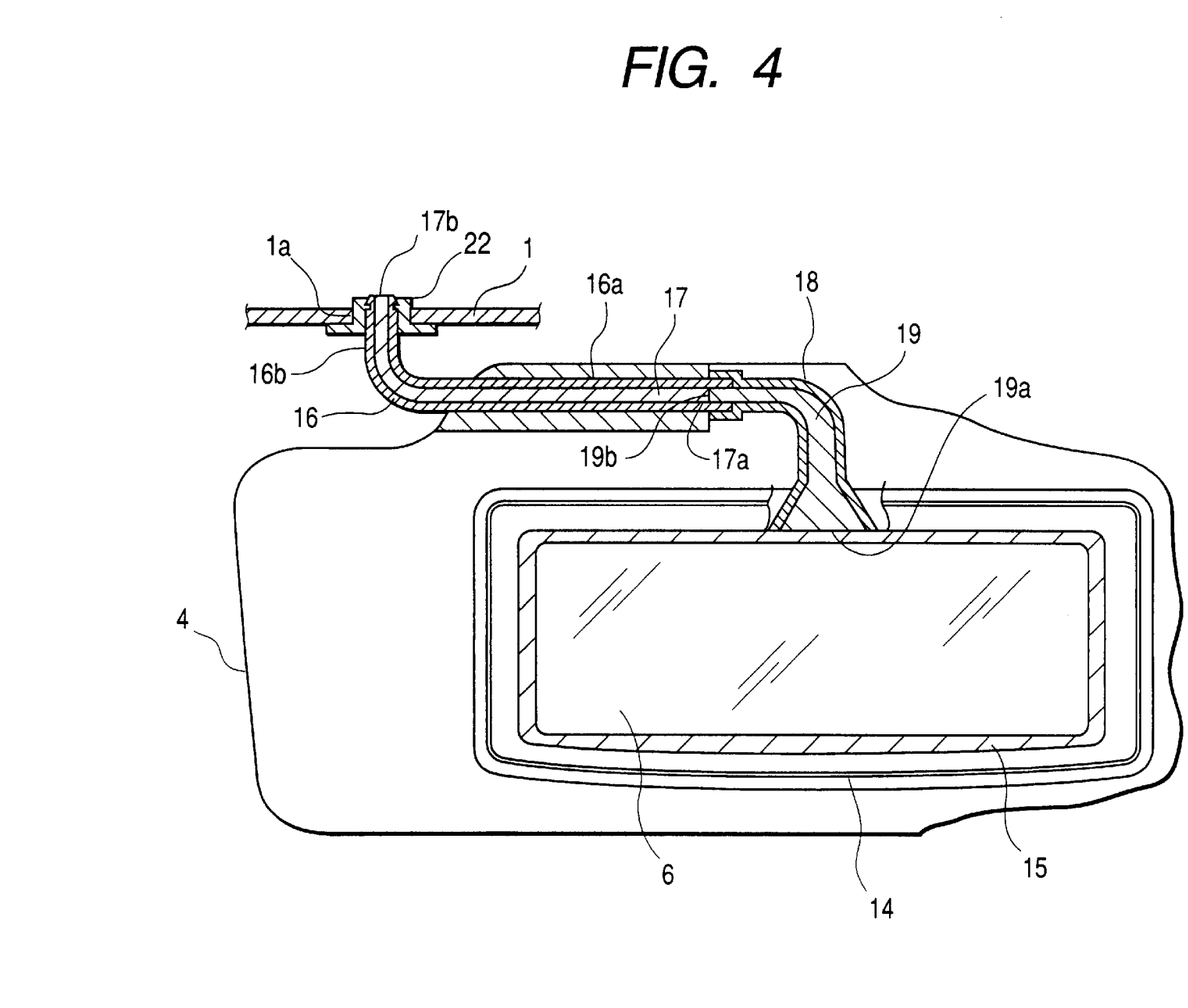
FIG. 4 is a front elevational cross sectional view showing an essential portion of the sunvisor body.

As shown in FIG. 4 in detail, a translucent (made of, for example, transparent acrylic resin) light guide 17 for the stay 16 is insert-molded into the stay 16. Each of an emission end 17a and an incident end 17b of the light guide 17 for the stay 16 is exposed over the end of each of the horizontal shaft portion 16a and the vertical shaft portion 16b.

An incident end 19b of a sunvisor-side light guide 19, which has an emission end 19a connected to the central portion of the upper portion of the illuminating light guide 15 and which is formed into an inverted L-shape, is disposed in a deep portion of the insertion hole 5a of the visor holder 5. An outer surface of the sunvisor-side light guide 19 except for the emission end 19a and the incident end 19b is covered with a cover member 18.

When the horizontal shaft portion 16a of the stay 16 is inserted into the insertion hole 5a of the visor holder 5, the emission end 17a of the light guide 17 for the stay 16 at the end of the horizontal shaft portion 16a is made to be opposite to the emission end 19a of the sunvisor-side light guide 19 apart from the emission end 19a for a slight gap. As for the vertical movement of the sunvisor body 4 around the horizontal shaft, the vertical movement of the sunvisor body 4 does not encounter any problem. The reason for this lies in that the emission end 19a of the sunvisor-side light guide 19 is opposite to the emission end 17a of the light guide 17 for the stay 16 at the end of the horizontal shaft portion 16a apart from the emission end 17a for a slight gap.

Figure 1:
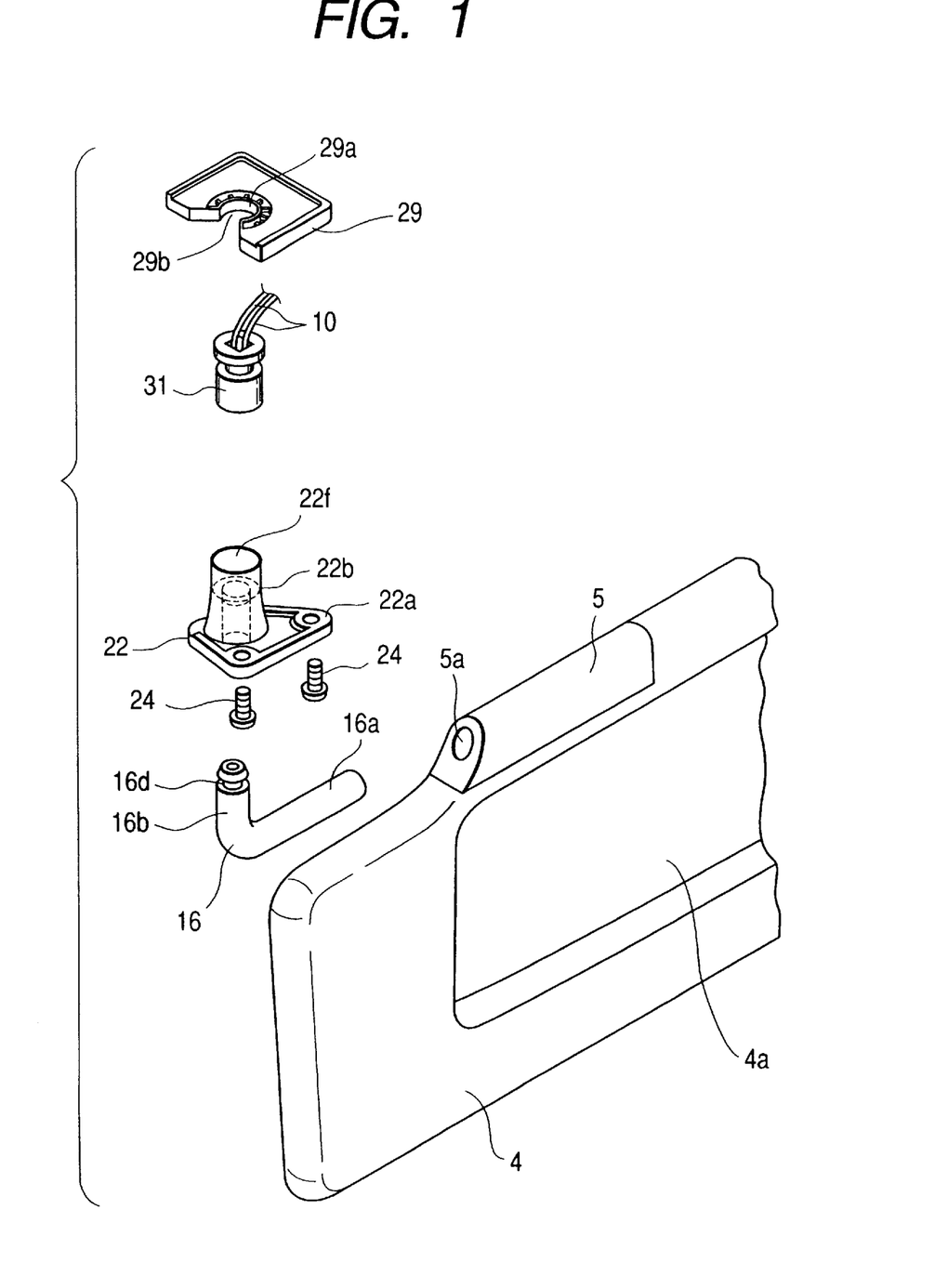
FIG. 1 is an exploded perspective view showing a sunvisor according to the present invention.
Figure 2:
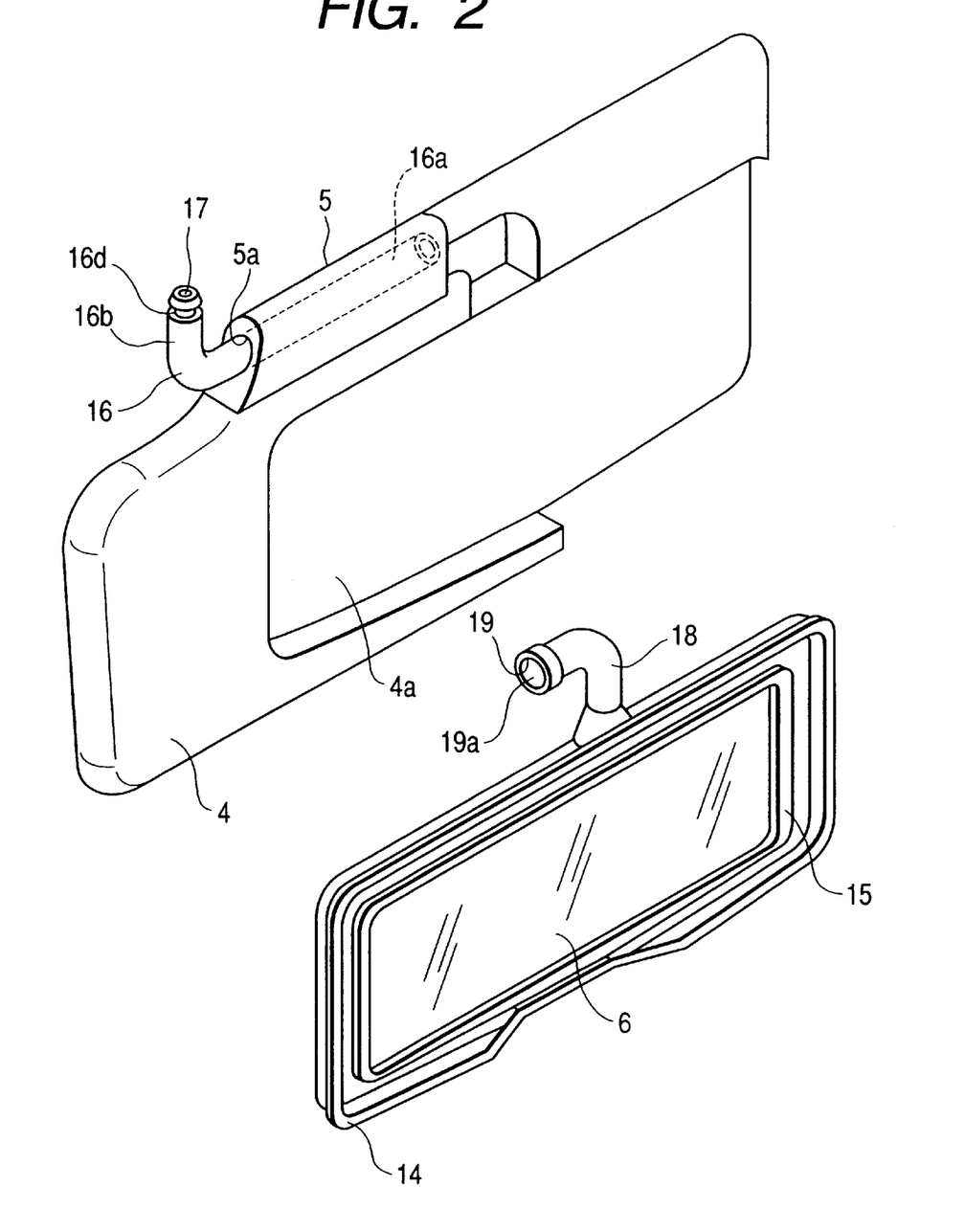
FIG. 2 is an exploded perspective view showing a sunvisor body and a frame.
Figures 3A, 3B:
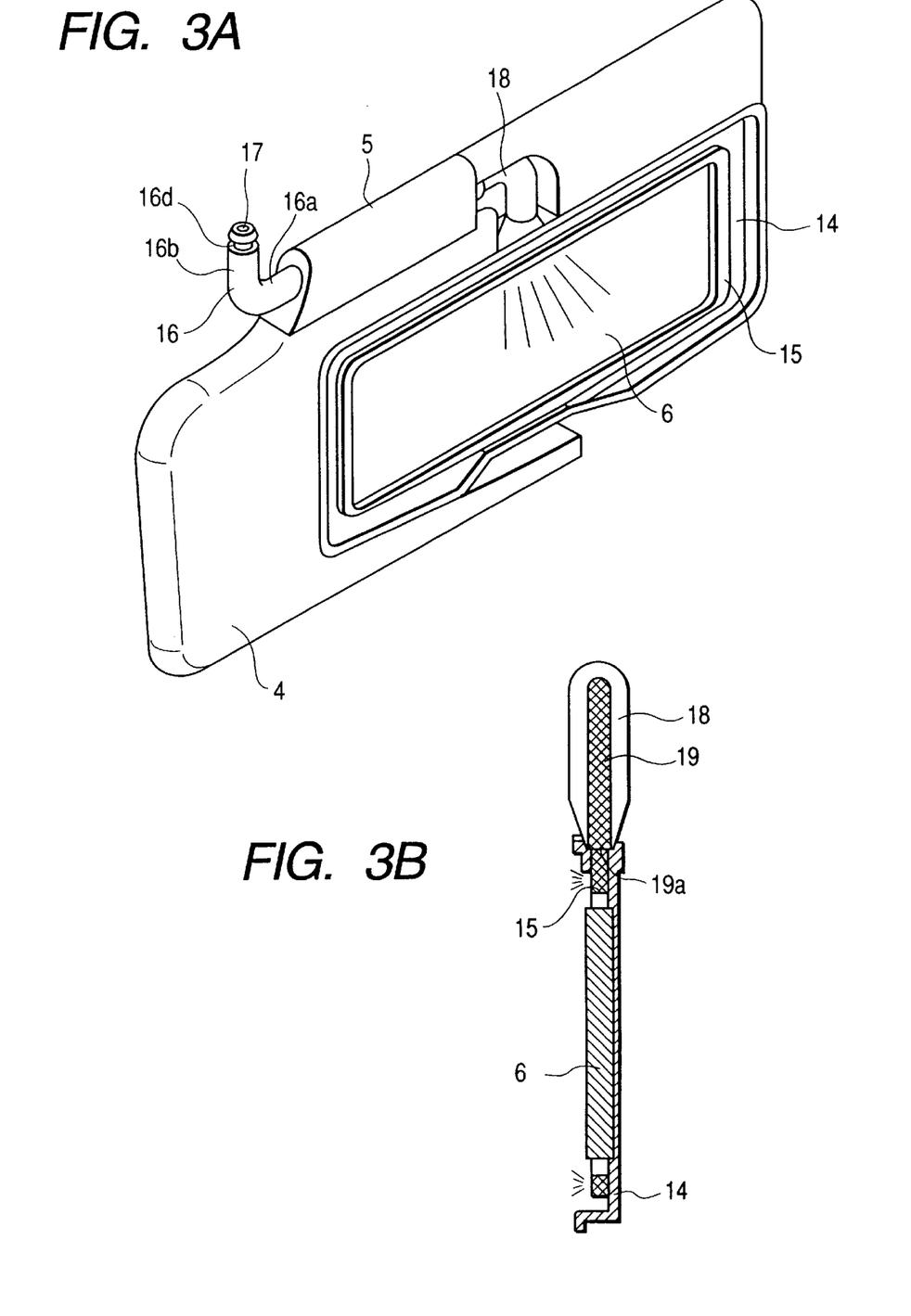
FIG. 3A is a perspective view showing the sunvisor body to which the frame has been joined.
FIG. 3B is a cross sectional view of FIG. 3A.
Figure 5:
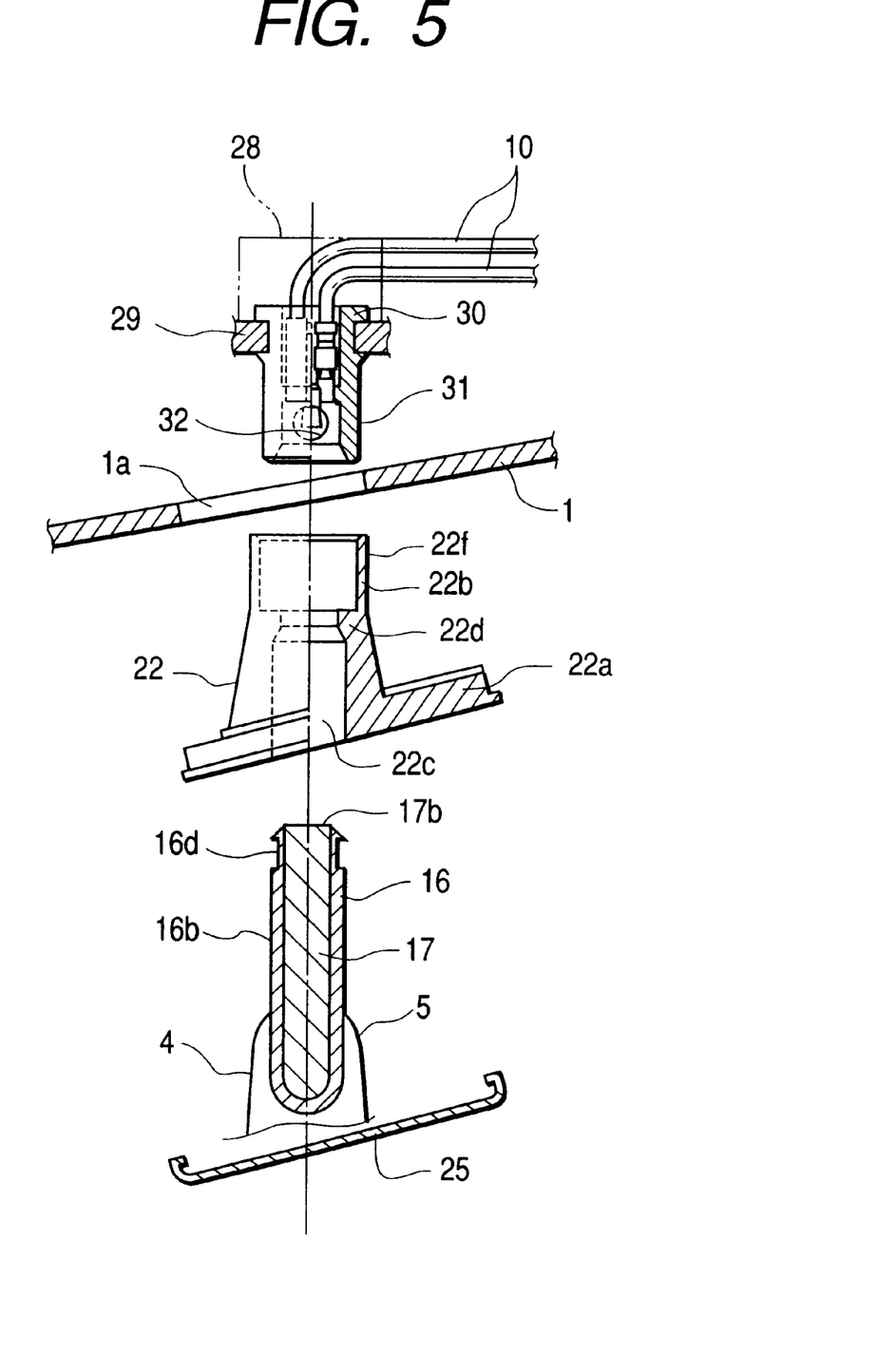
FIG. 5 is an exploded side view showing a stay, a stay holder and a lamp socket.
Figure 6:
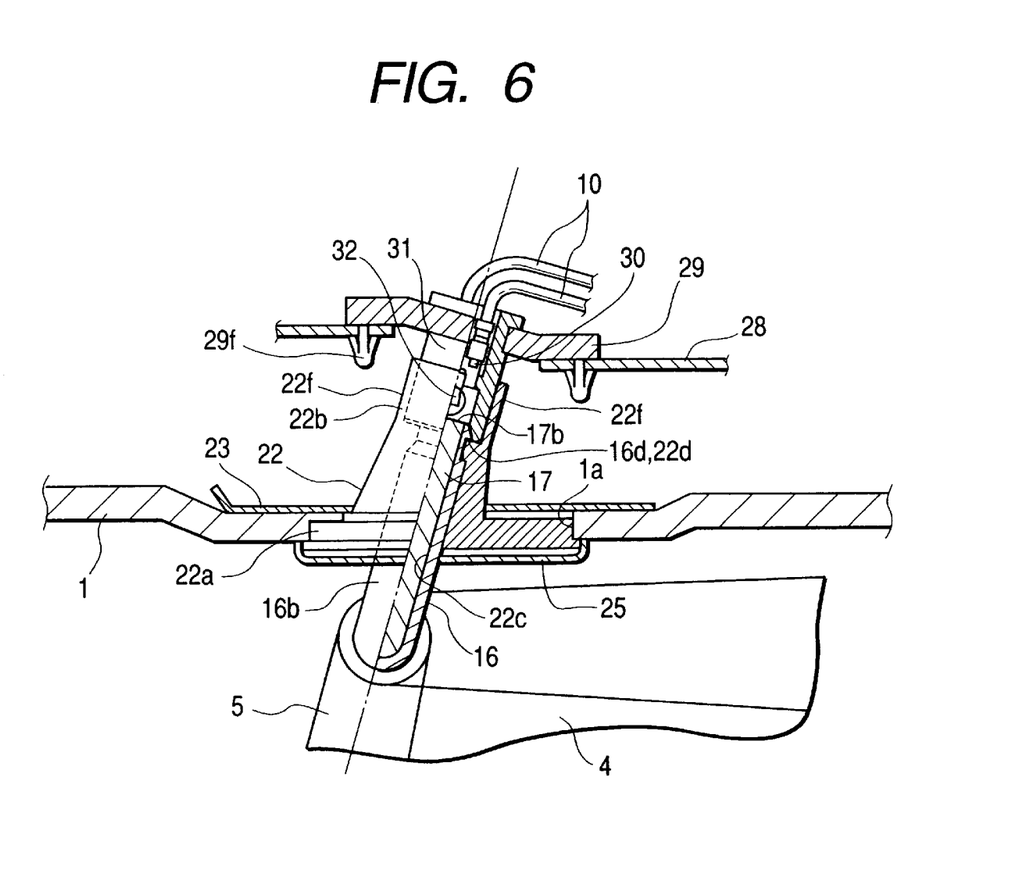
FIG. 6 is a side view showing the assembled stay, stay holder and the lamp socket.

As shown in FIGS. 1, 5 and 6, a stay holder 22 which is joined to the roof panel 1 in the cabin incorporates a flange portion 22a which contacts the lower surface of the roof panel 1 and a holder portion 22b which is inserted into the joining hole 1a of the roof panel 1. The flange portion 22a is secured to the roof panel 1 with screws 24 by using screw washers 23 (see FIG. 6) which contacts the upper surface of the roof panel 1. Note that the flange portion 22a is covered with a cover 25.

An insertion hole 22c, into which the vertical shaft portion 16b of the stay 16 is inserted rotatively around the vertical shaft, is formed in the lower portion of the holder portion 22b of the stay holder 22. An engaging projection 22d for securing an outer groove 16d of the vertical shaft portion 16b when the vertical shaft portion 16b has been inserted to a predetermined depth is formed in the upper portion of the insertion hole 22c. Thus, the vertical shaft portion 16b is locked so that removal of the vertical shaft portion 16b from the insertion hole 22c is prevented. When the vertical shaft portion 16b of the stay 16 has been inserted into the insertion hole 22c, the sunvisor body 4 is supported such that the lateral movement (when the sunvisor is used) of the sunvisor body 4 around the vertical shaft is permitted. A sleeve portion 22f is formed in the upper portion of the holder portion 22b of the stay holder 22.

Figure 7:
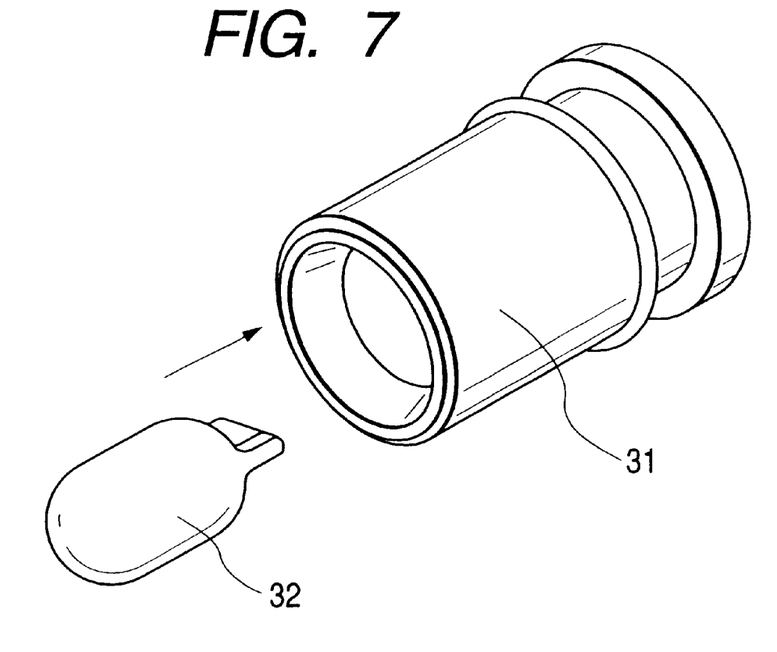
FIG. 7 is an exploded perspective view showing a lamp and the lamp socket.
Figure 8:
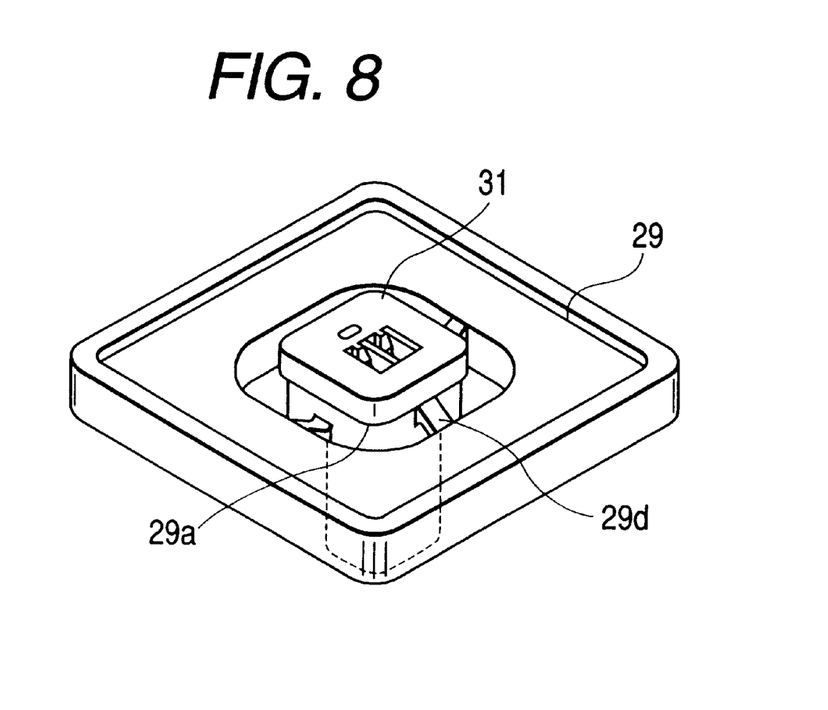
FIG. 8 is a perspective view showing a socket holder according to a modification of the embodiment.

A lamp socket 31, which accommodates a terminal 30 to which an electric wire 10 extended from a battery mounted on the vehicle is connected and an illuminating lamp 32 (see FIG. 7), is joined to a socket holder 29 joined to a car-body member 28 in the roof panel 1. When the stay holder 22, which supports the vertical shaft portion 16b of the stay 16, is joined to the roof panel 1, the incident end 17b of the light guide 17 for the stay 16 at the end of the vertical shaft portion 16b is positioned proximal to and facing an illuminating lamp 32 of the lamp socket 31 apart from the illuminating lamp 32 for a slight gap while the sleeve portion 22f is being inserted into the lamp socket 31. As for the lateral movement of the sunvisor body 4 around the vertical shaft, the lateral movement of the sunvisor body 4 does not encounter any problem. The reason for this lies in that the illuminating lamp 32 of the lamp socket 31 is positioned proximal to the incident end 17b of the light guide 17 for the stay 16 at the end of the vertical shaft portion 16b apart from the incident end 17b for a slight gap.

Figure 9A:
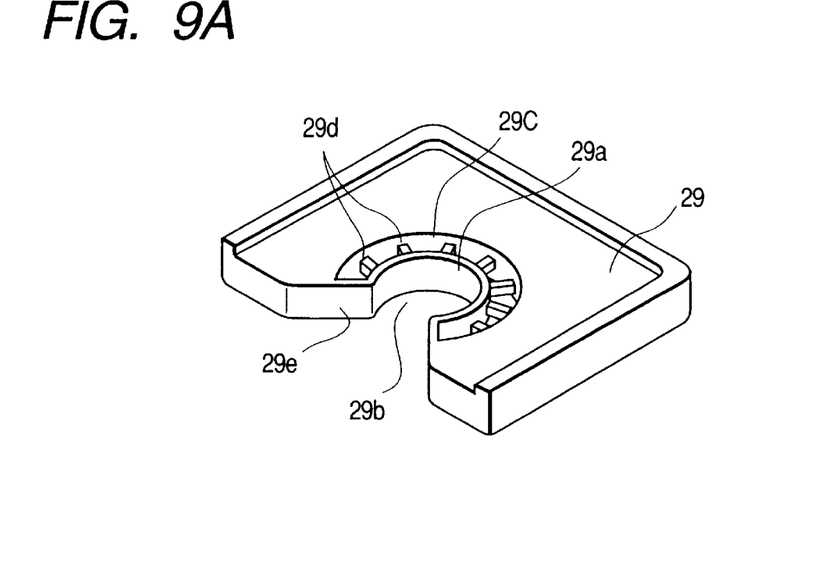
FIG. 9A is a perspective view showing the socket holder.
Figure 9B:
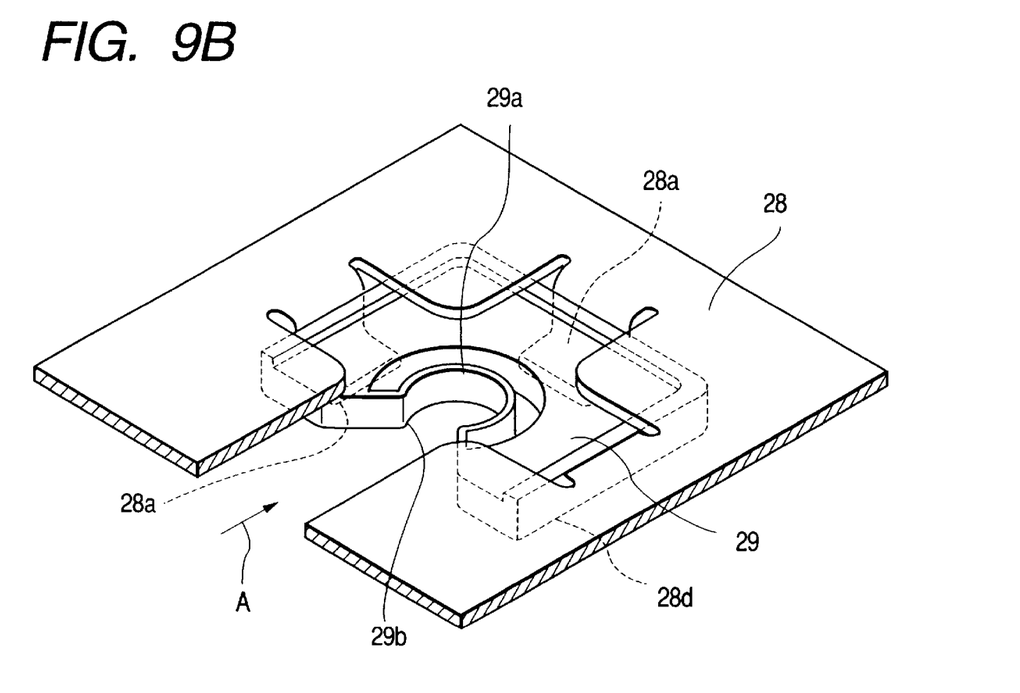
FIG. 9B is a perspective view showing an insertion portion of the car-body member.

As shown in FIGS. 9A and 9B, the socket holder 29 has a cylindrical insertion hole portion 29a into which the lamp socket 31 is inserted. The insertion hole portion 29a has an outward-opened slit 29b into which the lamp socket 31 is inserted from a direction (from a side position) perpendicular to the axial direction. Semi-circular cut portions 29c are formed around the insertion hole portion 29a. The cut portions 29c are connected by a plurality of thin bridge portions 29d so that slight displacement of the insertion hole portion 29a in the direction perpendicular to the axial direction is permitted.

The car-body member 28 has an insertion portion 28a formed by cutting upwards the three sides and by inwardly bending the leading ends of the three sides. The socket holder 29 is inserted through one of the portions of the insertion portion 28a (see an arrow A shown in FIG. 9B). Note that the socket holder 29 may be joined to the car-body member 28 with a snap portion 29f, as shown in FIG. 6. The lamp socket 31 is not required to be rotated in the insertion hole portion 29a of the socket holder 29. Therefore, the insertion hole portion 29a may be formed into a rectangular shape as a substitute for the cylindrical shape so as to be inserted into a rectangular lamp socket 31 from the axial direction.

To constitute the foregoing structure, the light guide 17 for the stay 16 is insert-molded into the stay 16. The lamp socket 31, which holds the illuminating lamp 32 for emitting illuminating light to the incident end 17b of the light guide 17 for the stay 16, is, in the roof panel 1, disposed to be opposite to the end of the vertical shaft portion 16b of the stay 16. Moreover, the sunvisor body 4 is provided with the sunvisor-side light guide 19 for guiding, to the illuminating light guide 15, illuminating light emitted from the emission end 17a of the light guide 17 for the stay 16 at the end of the horizontal shaft portion 16a of the stay 16. Thus, illuminating light of the illuminating lamp 32 of the lamp socket 31 in the roof panel 1 is made incident on the incident end 17b of the light guide 17 for the stay 16 at the end of the vertical shaft portion 16b of the stay 16. Thus, illuminating light emitted from the emission end 17a of the light guide 17 for the stay 16 at the end of the horizontal shaft portion 16a of the stay 16 is guided to the illuminating light guide 15 through the sunvisor-side light guide 19. Thus, the illuminating light guide 15 illuminates the sunvisor.

As a result, a necessity of passing the electric wires of the vanity lamp into the L-shape stay which is required for the conventional technique can be eliminated. Thus, the operation for passing the electric wires can be omitted. Since the illuminating light guide 15 is formed into a frame shape which surrounds the vanity mirror 6 joined to the sunvisor body 4, uniform illumination from the outside of the vanity mirror 6 is permitted.

The operation for inserting the horizontal shaft portion 16a of the stay 16 into the visor holder 5 causes the emission end 17a of the light guide 17 for the stay 16 at the end of the horizontal shaft portion 16a to be opposite to the emission end 19a of the sunvisor-side light guide 19. Therefore, the operation for connecting the connectors required for the conventional technique can be eliminated.

The operation for joining the stay holder 22 to the roof panel 1 causes the incident end 17b of the light guide 17 for the stay 16 at the end of the vertical shaft portion 16b to be opposite to the socket holder 29 of the lamp socket 31. Therefore, the operation for connecting the connectors which has been required for the conventional technique can be omitted.

The socket holder 29 into which the lamp socket 31 can be inserted and joined from the direction perpendicular to the axial direction is provided for the car-body member 28. Since the insertion hole portion 29a of the lamp socket 31 is able to be displaced in the direction perpendicular to the axial direction, the lamp socket 31 can be joined to the socket holder 29 of the car-body member 28 by the one-touch operation. Moreover, the lamp socket 31 can be displaced in the direction perpendicular to the axial direction thanks to the insertion hole portion 29a. Therefore, an error or the like from the holder portion 22b of the stay holder 22 which occurs when assembly is performed can be absorbed. Hence it follows that the holder portion 22b of the stay holder 22 can smoothly be inserted.

Since the socket holder 29 is inserted and joined to the insertion portion 28a of the car-body member 28, the socket holder 29 can be joined to the car-body member 28 by the one-touch operation.

Thus, a variety of operations concerning the illumination of the vanity mirror 6 of the sunvisor body 4 can be simplified.

As can be understood from the foregoing description, the structure for illuminating a sunvisor according to the present invention is arranged such that the stay-side light guide is insert-molded into the stay. Moreover, the lamp socket is provided for the inside portion of the roof panel. In addition, the sunvisor-side light guide and the illuminating light guide are provided for the sunvisor body. Thus, illuminating light of the lamp of the lamp socket is made incident on the incident end of the stay-side light guide. Illuminating light emitted from the emission end of the stay-side light guide is guided to the illuminating light guide through the sunvisor-side light guide. Thus, the sunvisor is illuminated with the illuminating light guide. Therefore, the electric wires of the vanity lamp are not required to pass through the L-shape stay. Thus, the operation for passing the electric wires can be omitted.

When the illuminating light guide is formed in the frame shape which surrounds the vanity mirror of the sunvisor body (aspect 2), illumination outward of the vanity mirror occurs.

When the incident end of the sunvisor-side light guide is joined to the visor holder of the sunvisor body (aspect 3), the operation for inserting the horizontal end portion of the stay into the visor holder can simply be completed by making the emission end of the stay-side light guide at the end of the horizontal shaft portion to be opposite to the incident end of the sunvisor-side light guide. Therefore, the operation for connecting the connectors which has been required for the conventional technique can be omitted.

When the lamp socket is joined to the car-body member in the roof panel (aspect 4), the operation for joining the stay holder to the roof panel can be completed by simply making the incident end of the stay-side light guide at the end of the vertical shaft portion to be opposite to the lamp of the lamp socket. Therefore, the operation for connecting the connectors which has been required for the conventional technique can be omitted.

When the socket holder is provided for the car-body member and the joining portion of the socket holder can be displaced in the direction perpendicular to the axial direction (aspect 5), the lamp socket can be joined to the socket holder of the car-body member by the one-touch operation. Moreover, the lamp socket can be displaced in the direction perpendicular to the axial direction by the joining portion. Therefore, an error or the like from the holder portion of the stay holder which occurs when assembly is performed can be absorbed. As a result, the holder portion of the stay holder can smoothly be inserted.

When the insertion portion is provided for the car-body member and the socket holder is inserted and joined to the insertion portion (aspect 6), the socket holder can be joined to the car-body member by the one-touch operation.

What is claimed is:

1. An apparatus for illuminating a sunvisor wherein a horizontal shaft portion of an L-shape stay having a vertical shaft portion rotatively connected via by a stay holder to a roof panel of a vehicle is inserted into a visor holder of a sunvisor body so that said sunvisor body is supported movably in the vertical direction around a horizontal shaft and said sunvisor body has an illuminating member, said apparatus for illuminating a sunvisor comprising:
a stay-side light guide insert-molded into said stay;
a lamp socket which holds a lamp, the light from which is made incident on an incident end of said stay-side light guide and which is disposed proximal to an end of the vertical shaft portion of said stay; and
a sunvisor-side light guide integrally connected to said sunvisor body and arranged to introduce, to an illuminating light guide, light emitted from an emission end of said stay-side light guide at the end of the horizontal shaft portion of said stay.

2. The apparatus for lighting a sunvisor according to claim 1, wherein
said illuminating light guide is a frame-shape member which surrounds an outer surface of a vanity mirror joined to said sunvisor body.

3. The apparatus for illuminating a sunvisor according to claim 1, wherein
the incident end of said sunvisor-side light guide is joined to said visor holder of said sunvisor body so that the emission end of said stay-side light guide at the end of the horizontal shaft portion is made to be proximal to and facing the incident end of said sunvisor-side light guide when the horizontal shaft portion of said stay is inserted into said visor holder.

4. The apparatus for illuminating a sunvisor according to claim 1, wherein
said lamp socket, to which an electric wire extended from a battery is connected, is joined to a car-body member disposed in said roof panel so that the incident end of said stay-side light guide is made to be proximal to and facing said lamp of said lamp socket when said stay holder which supports a stay-side end of the vertical shaft portion is joined to said roof panel.

5. The apparatus for illuminating a sunvisor according to claim 4, wherein
said car-body member has a socket holder to which said lamp socket can be inserted and joined from any one of an axial direction and a direction perpendicular to the axial direction, and displacement of a joining portion of said socket holder in the direction perpendicular to the axial direction is permitted.

6. The apparatus for illuminating a sunvisor according to claim 5, wherein
an insertion portion is integrally connected to said car-body member, and said socket holder is inserted and joined to the insertion portion.

* * * * *